United States Patent
Lei et al.

(10) Patent No.: US 11,363,533 B2
(45) Date of Patent: Jun. 14, 2022

(54) METHOD AND APPARATUS FOR SELECTIVE VEHICULAR POWER-PRESERVING CELLULAR BAND ENABLEMENT

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 519 days.

(21) Appl. No.: 15/869,320

(22) Filed: Jan. 12, 2018

(65) Prior Publication Data

US 2019/0223106 A1 Jul. 18, 2019

(51) Int. Cl.
*H04W 52/02* (2009.01)
*H04L 12/46* (2006.01)
*H04W 52/04* (2009.01)
*H04L 12/40* (2006.01)

(52) U.S. Cl.
CPC ... *H04W 52/0261* (2013.01); *H04L 12/40039* (2013.01); *H04L 12/4625* (2013.01); *H04W 52/04* (2013.01)

(58) Field of Classification Search
CPC .............. H04W 52/0261; H04L 12/4625
USPC ................. 455/522, 69, 452.1, 509
See application file for complete search history.

(56) References Cited

U.S. PATENT DOCUMENTS

| | | | |
|---|---|---|---|
| 2002/0163449 A1* | 11/2002 | Flick | B60R 25/04 340/988 |
| 2002/0163450 A1* | 11/2002 | Flick | B60R 25/04 340/988 |
| 2008/0209246 A1* | 8/2008 | Marks | H04L 12/12 713/323 |
| 2010/0268971 A1* | 10/2010 | Poo | H04W 52/0261 713/320 |
| 2011/0039556 A1* | 2/2011 | Yi | H04W 48/16 455/434 |
| 2011/0112969 A1* | 5/2011 | Zaid | G06Q 10/02 705/50 |
| 2012/0077433 A1* | 3/2012 | Walker | H04M 1/7253 455/41.1 |
| 2012/0213177 A1* | 8/2012 | Lee | H04W 52/0216 370/329 |
| 2013/0200995 A1* | 8/2013 | Muramatsu | B60R 25/24 340/5.51 |
| 2013/0219039 A1* | 8/2013 | Ricci | H04L 43/0876 709/223 |
| 2013/0225093 A1* | 8/2013 | Murakami | H04B 1/005 455/71 |

(Continued)

*Primary Examiner* — John J Lee
(74) *Attorney, Agent, or Firm* — Michael Spenner; Brooks Kushman P.C.

(57) ABSTRACT

A system includes a processor configured to determine that a vehicle is in a predefined power-preservation state. The processor is also configured to determine a lowest transmit-power available cellular band for vehicle telematics services, responsive to the power-preservation state. The processor is further configured to disable all bands other than the lowest-power available band and use the lowest-power available band for vehicle communication as long as the power-preservation state persists.

3 Claims, 3 Drawing Sheets

(56) References Cited

U.S. PATENT DOCUMENTS

| | | | | |
|---|---|---|---|---|
| 2014/0154973 A1* | 6/2014 | Schoppmeier | H04L 69/14 | 455/39 |
| 2014/0220902 A1* | 8/2014 | Clevorn | H04B 7/061 | 455/63.4 |
| 2015/0044964 A1* | 2/2015 | Khan | G06F 21/35 | 455/41.1 |
| 2015/0271767 A1* | 9/2015 | Lo | H04W 52/30 | 370/311 |
| 2015/0348333 A1* | 12/2015 | Ward, III | G07B 15/02 | 705/13 |
| 2016/0099876 A1* | 4/2016 | Oezdemir | H04W 4/21 | 709/202 |
| 2016/0104373 A1* | 4/2016 | Geerlings | H04Q 9/00 | 340/5.25 |
| 2016/0173157 A1* | 6/2016 | Park | H04B 1/3822 | 370/329 |
| 2016/0197743 A1* | 7/2016 | Su | H04L 12/462 | 370/401 |
| 2016/0330729 A1* | 11/2016 | Wei | H04W 52/244 | |
| 2017/0013559 A1* | 1/2017 | Sumitomo | H04W 52/0254 | |
| 2017/0088072 A1* | 3/2017 | Curtis | G08B 21/182 | |
| 2017/0164287 A1* | 6/2017 | Ozawa | H04W 52/0235 | |
| 2017/0188402 A1* | 6/2017 | Park | H04W 76/14 | |
| 2018/0115438 A1* | 4/2018 | Park | H04W 76/16 | |
| 2018/0190305 A1* | 7/2018 | Younger | H04M 1/72522 | |

* cited by examiner

METHOD AND APPARATUS FOR SELECTIVE VEHICULAR POWER-PRESERVING CELLULAR BAND ENABLEMENT

TECHNICAL FIELD

The illustrative embodiments generally relate to methods and apparatuses for selective vehicular power-preserving cellular band enablement.

BACKGROUND

Cellular providers continually seek to improve network reliability and coverage, as well as throughput rates, with an ever increasing demand on networks from a data perspective. One of the periodic and powerful changes involves implementation of new networks and standards, such as 3G and 4G. The next generation, unsurprisingly, is called 5G.

5G networks use mmWave band for a high-throughput connection. As a result of using mmWave, 5G networks have a short range relative to 4G or 3G networks. In the past, when a new network (e.g., 4G) was released, the previous network (e.g., 3G) was only used as a backup network, such that 3G was enabled, for example, when 4G was unavailable. With 5G technology, because of the limited range, 5G and 4G connectivity will co-exist, so that phones which range out of the short range 5G coverage still have continual coverage on existing 4G networks.

Vehicle modems and telematics modules will similarly support dual-connectivity, but such dual connectivity means that more power is drawn by establishing connections to both networks.

SUMMARY

In a first illustrative embodiment, a system includes a processor configured to determine that a vehicle is in a predefined power-preservation state. The processor is also configured to determine a lowest transmit-power available cellular band for vehicle telematics services, responsive to the power-preservation state. The processor is further configured to disable all bands other than the lowest-power available band and use the lowest-power available band for vehicle communication as long as the power-preservation state persists.

In a second illustrative embodiment, a system includes a processor configured to receive a file transfer request over a currently enabled cellular band, at a vehicle in a predefined power-preservation state. The processor is also configured to determine a characteristic of the request predefining the request for processing over a faster available band than the currently enabled band. Further, the processor is configured to enable the faster available band for processing the request and disable the currently enabled band, until handling of the request is completed, responsive to the determination.

In a third illustrative embodiment, a computer-implemented method includes disabling all available cellular band connections except for a currently available cellular band connection determined to require the lowest power usage of the all available cellular band connections, responsive to detecting a vehicle power-preservation state.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
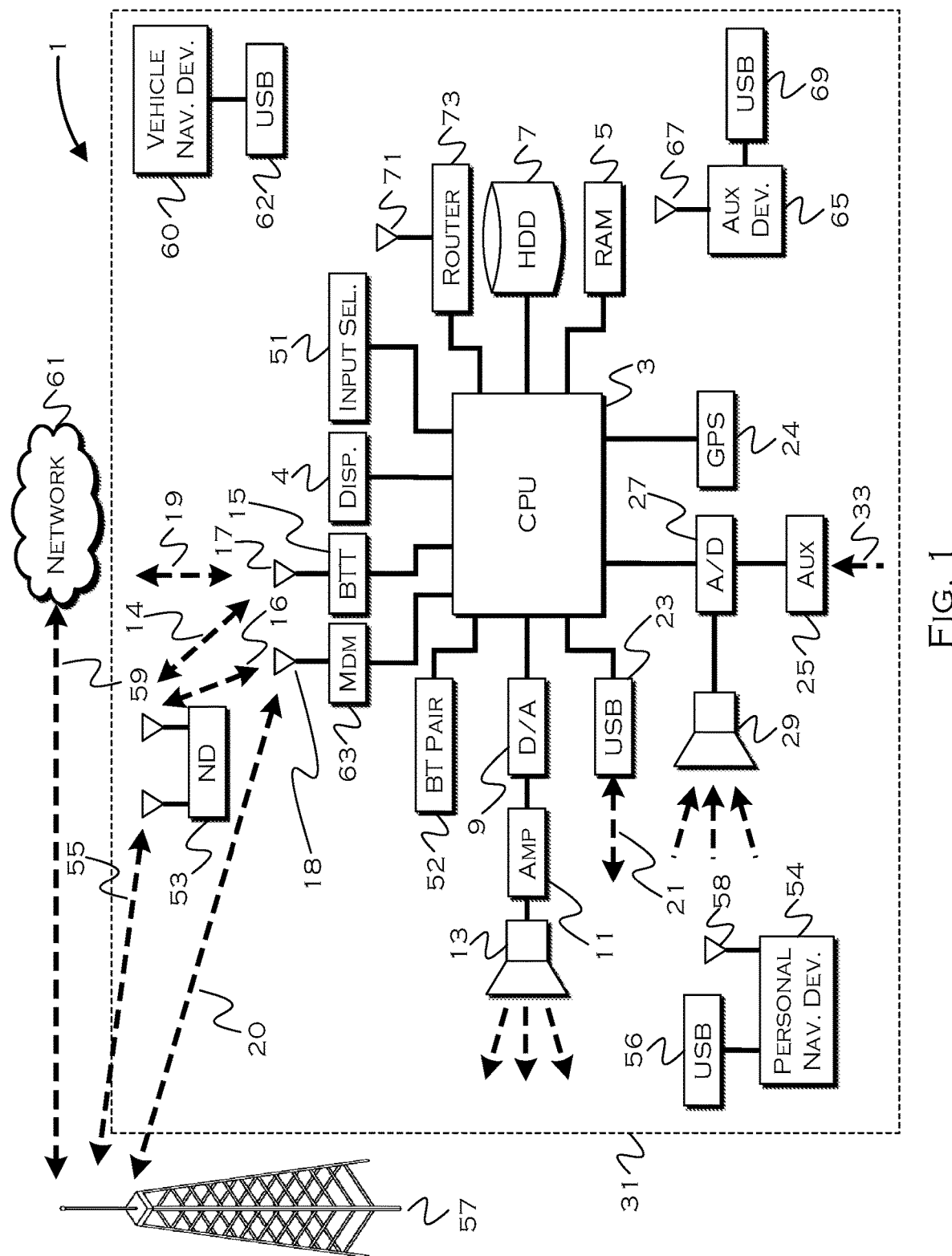
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While vehicle telematics devices will support dual 4G/5G connections, under new 5G network environments, those support strategies and that technology will involve additional power consumption, due to the provision of both network options simultaneously.

The illustrative embodiments propose selective preservation of a low-power cellular band connection when vehicle needs to preserve battery state (e.g., when parked) and resumption of disconnected bands when the vehicle resumes travel.

Figure 2:
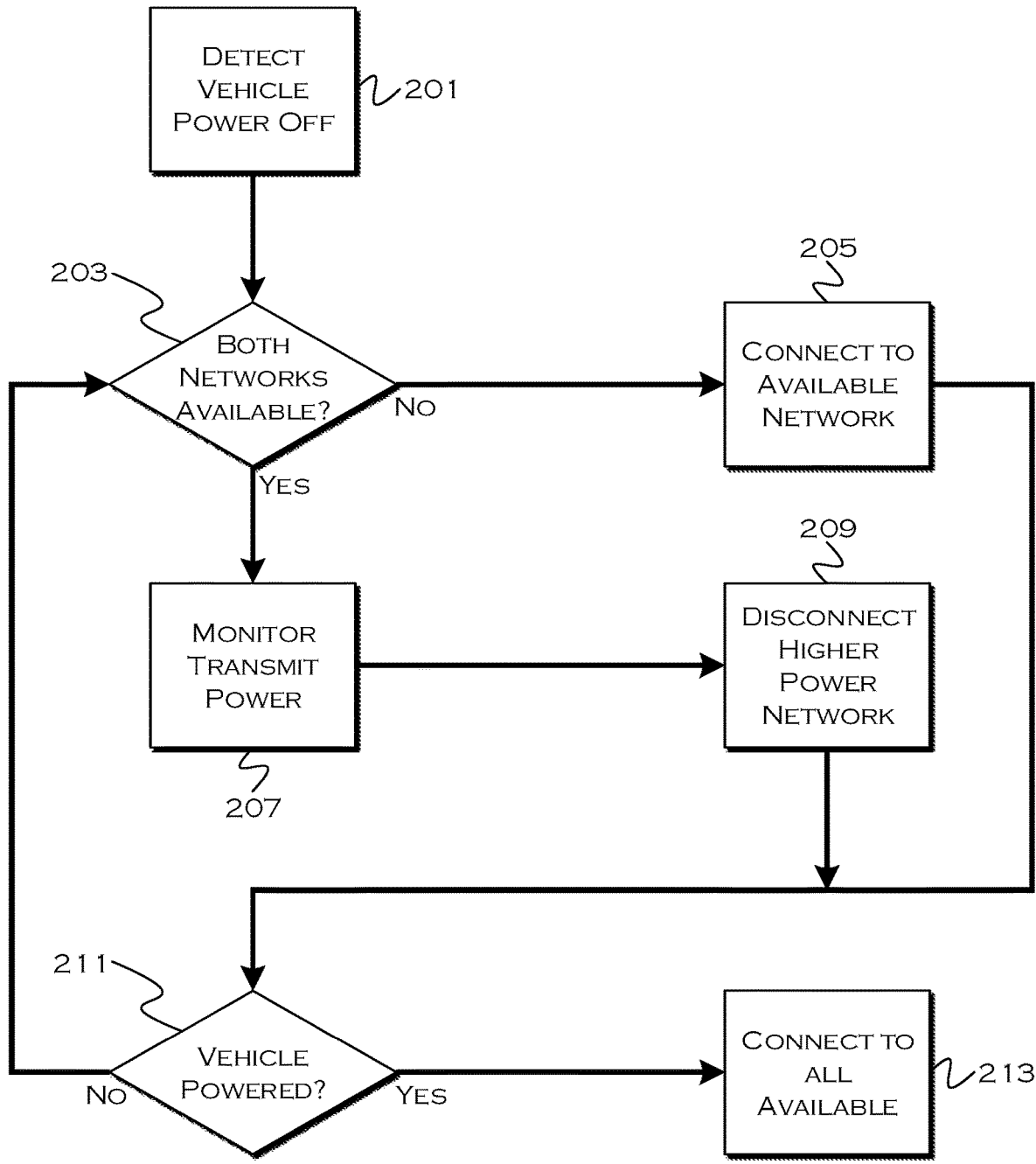
FIG. 2 shows an illustrative process for selective network disconnection.

FIG. 2 shows an illustrative process for selective network disconnection. In this example, the process engages 201 when a vehicle is in a power-preservation state, such as the park state in this example (or a park state where the vehicle is also not charging, for electric powered vehicles). Engagement in other power-preservation states is also possible. Since not all networks are disconnected, the vehicle may simply lose through-put, not connectivity, and so if power-preservation is paramount, the process could be used to preserve a connectivity state and power in any power-critical instance.

In this example, the process determines 203 if multiple bands are currently available for connection or in-use by the vehicle telematics system. If there is only one available connection, the system simply uses 205 the available connection and disables all other connections. Since the vehicle may want to preserve connectivity for remote services, having one connection is still useful, but having all possible simultaneous connections may over-use vehicle power resources. Since a single connection can still support remote requests, there is limited or no typical need for dual connectivity when power is at a premium (e.g., an electric power resource).

If there are multiple current or possible connections, the process may monitor 207 the transmit power associated with each connection. Based on the transmit power associated with each available or current connection, the process selectively disengages and disables all but the lowest power connection (or a single connection below a particular threshold). If multiple connections are suited to serve communication needs, the process may disable all but lowest power connection of the group (along with other connectivity options), but, for example, if a lowest-power connection cannot service the vehicle needs, the process may select the lowest power connection that can also still service the vehicle needs.

Until the vehicle is powered 211 (or other end-of-state associated with an end of a power-critical state, such as a vehicle obtaining sufficient charge), the process will continue using the single enabled band. Once there is sufficient power available (the vehicle is in drive, power is obtained, etc), the process may resume 213 connectivity by re-enabling all disabled bands.

Figure 3:
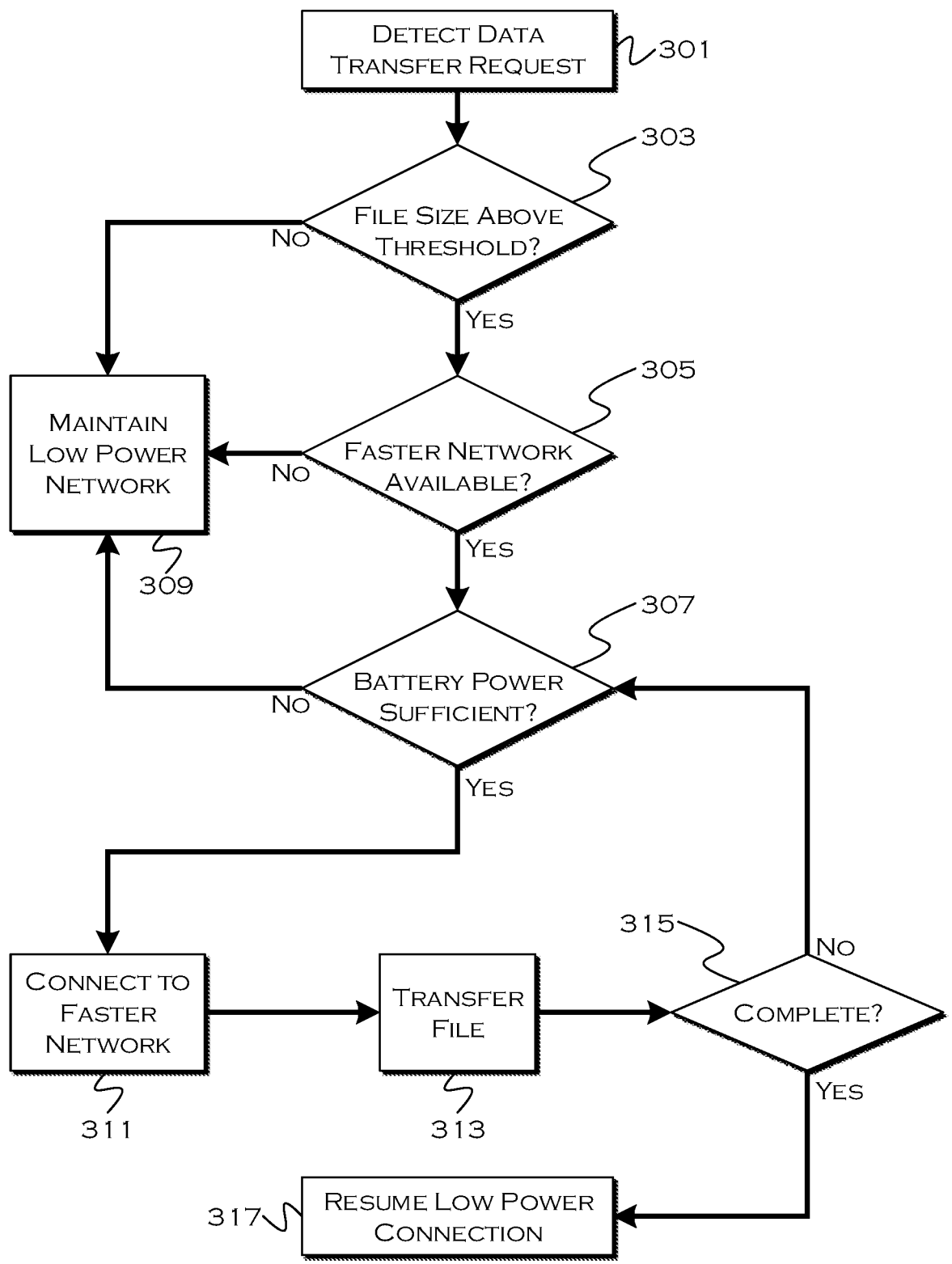
FIG. 3 shows an illustrative temporary network resumption process.

FIG. 3 shows an illustrative temporary network resumption process. In this illustrative example, the process responds to a file transfer request or other data-intensive request. Since vehicles often update software when parked, and since those software updates are often important, being able to fully process an update request during a single off-cycle may be useful. If the request is sufficiently large or time-consuming, the lowest-power band currently used by the vehicle may not be sufficient to complete the request during a single off-cycle. In other instances, it may simply be more efficient (in terms of aggregate power usage) to actively use a higher power, but much faster, band to handle a large request, and then resume communication over the lower-power band to service other requests.

In some instances, a software update may always be handled by the fastest available band, even if not power-optimal, because the system does not necessarily know when the power-off state will end. As long as sufficient power exists to handle the request on the faster band, in these instances, the system uses the potentially less efficient connection in the interest of completing the update in a single off-cycle.

In this example, the process detects 301 or receives a large file transfer request or similar data-intensive request. This example presents a process that determines if: a) the file size is above a threshold 303; b) there is even a faster network than the currently connected network that is available 305; and c) whether the current electric power 307 is sufficient to handle processing the request over the higher power-drawing band. Another consideration, as opposed to file size, for example, may be the overall expected power usage (higher power but shorter time) between the current band and a higher power-drawing band.

If the conditions are not met, the process services 309 the request using a currently connected lowest or lower power-drawing band. If the conditions for swapping are met, the process may connect 311 to a faster band and disable the previous lower-power band for the duration of the transfer.

Using the higher power-drawing and faster band, the process may then transfer the file and, once the transfer is complete 315, the process may disable the higher power-drawing band and resume 317 a lower power-drawing connection. In this example, the process continues to check power resources 307 prior to completion of the request, so that reserves are not over-depleted by processing of the request at the higher speed.

The illustrative embodiments allow for selective band engagement considering power usage when vehicles with dual-connectivity options are in power-critical/preservation states. Connectivity is maintained, but all connectivity options do not need to be available, unless needed for spot utility.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising: a processor configured to: determine that a vehicle is in a predefined power-preservation state; responsive to the power-preservation state, determine a lowest transmit-power available cellular band for vehicle telematics services; disable all bands other than the lowest-power available band, responsive to determining the lowest transmit-power band; use the lowest-power available band for vehicle communication as long as the power-preservation stale persists, and receive a transmit request over the lowest-power available band, for a file transfer; determine that the file transfer request is suited for processing over a currently disabled band; and disable the lowest-power band and enable the currently disabled band, for the duration of the file transfer, responsive to the determination.

2. The system of claim 1, wherein the determination that the file transfer request is suited for processing over a currently disabled band is based on an expected size of the file transfer request.

3. The system of claim 1, wherein the determination that the file transfer request is suited for processing over a currently disabled band is based on an expected duration of the file transfer request over the currently disabled band compared to the lowest-power available band.

* * * * *